Aug. 12, 1969     D. B. RISHER     3,460,574
MULTIPORT VALVE

Original Filed Aug. 28, 1964     3 Sheets-Sheet 1

INVENTOR
Donald B. Risher

BY J. O. Tresansky
ATTORNEY

Aug. 12, 1969    D. B. RISHER    3,460,574
MULTIPORT VALVE

Original Filed Aug. 28, 1964    3 Sheets-Sheet 2

United States Patent Office 3,460,574
Patented Aug. 12, 1969

3,460,574
MULTIPORT VALVE
Donald B. Risher, Bowie, Md., assignor to the United States of America as represented by the Secretary of the Navy
Original application Aug. 28, 1964, Ser. No. 392,967, now Patent No. 3,326,046, dated June 20, 1967. Divided and this application Feb. 6, 1967, Ser. No. 630,480
Int. Cl. F16k 11/00
U.S. Cl. 137—625.66                                    10 Claims

ABSTRACT OF THE DISCLOSURE

A multiport valve assembly for use in a system for calibrating and measuring pressures at a large number of stations within supersonic or hypersonic wind tunnels. The multiport valve assembly includes (1) a housing provided with (a) a cylindrical chamber having a first radius, a central axis, and a flat end, (b) eight inner passages, each having one port opening into the chamber at the flat end, at a first radial distance from the axis, and equally circumferentially spaced, (c) eight outer passages, each having one port opening into the chamber at the flat end, at a second larger radial distance, and radially aligned with the inner passage ports, and (d) another passage having a port opening into the chamber near the end opposite the flat end; (2) a disc valve having a radius less than the first radius but greater than the first radial distance, a central axis, and a flat first end, the disc valve being rotatably mounted coaxially within the chamber with its flat end sealingly abutting the flat end of the chamber, and provided with (a) eight passages, each having inner and outer ports at the first and second radial distances from the axis and equally circumferentially spaced and radially aligned and (b) eight passages, each having one port at the first radial distance from the axis, positioned between the aforementioned inner ports, on the flat end of the disc valve, and another port on the end of the disc valve opposite the flat end; and (3) means for intermittently rotating the disc valve including (a) a shaft coaxially connected to the disc valve, (b) a radially extending connecting rod secured to the shaft, (c) a reciprocally slidably mounted piston in a cylinder operatively connected to the rod, and (d) pressure tubes fluidly connected to opposite ends of the cylinder. O-rings are provided around each of the ports in the valve housing.

The invention described herein may be manufactured and used by or for the Government of the United States of America for governmental purposes without the payment of any royalties thereon or therefor.

This application is a division of my copending application, Ser. No. 392,967, filed Aug. 28, 1964, now Patent No. 3,326,046.

This invention relates to a system for calibrating and measuring pressures within supersonic and hypersonic wind tunnels, and more particularly to high speed calibration and pressure measurement at a large number of stations within a wind tunnel.

Systems for the accurate measurement of a large number of pressures in a short period of time have received considerable attention in the past. Such systems have a particular interest with respect to supersonic and hypersonic wind tunnel applications. The evolution of such pressure measuring systems extends from a single tube mercury manometer, the multiple tube manometer, oil filled manometers, dial gauges, pressure switches, to the many types of pressure transducers. In the design of a system for use in conjunction with high speed date reproduction apparatus, the technical areas which may be chosen to be optimized include high speed data taking capability, rapid pressure stabilization, and fast gauge calibration. High speed data reduction systems require pressure measuring instruments which provide an electrical output. Transducers are available which satisfy this requirement but careful consideration must be given to proper sensitivity, selection, repeatability, and linearity. Since pressure switching cannot be tolerated in high speed systems, each pressure to be measured should be measured with one transducer. In order to provide for the rapid calibration of a large plurality of gauges, a valving system is required that will isolate tunnel pressures during calibration and provide all transducers having the same pressure range with common reference pressures. After the calibration has been performed, the valving system must provide a direct path between each pressure line and its corresponding transducer and isolate the calibration pressure from the transducers. The valving system and drive mechanism for positioning the valves must be located inside the tunnel and be controlled from a point outside the tunnel.

This invention provides a novel valve and pressure transducer assembly which makes possible the calibration of a large number of pressure transducers which may be connected to a large number of different pressure stations. In this invention a pressure transducer and valve assembly, two sets of eight radially disposed and aligned pressure transducers are mounted in a cylindrical block and controlled by a pair of rotary valves. By connecting three of these cylindrical units together, a system for calibrating the pressure transducers and measuring pressures at forty-eight separate locations may be accomplished. Each of the several units may be placed within the wind tunnel such that a minimum amount of tubing is required between the actual points of pressures measured and the corresponding pressure transducer. By utilizing two of these assembly units, pressures may be independently measured from as many as ninety-six positions within the tunnel. These assembly units may be water cooled if desired to keep the temperature of the pressure transducers at a desired level.

It is an object of this invention to provide a pressure transducer and valve assembly in which a relatively large number of pressure transducers may be switched from test pressures to wind tunnel pressures in a very short period of time.

It is another objective of this invention to provide a rotary valve assembly for switching a plurality of pressure transducers from calibration pressures to actual wind tunnel test pressures simultaneously.

It is still another object of this invention to provide a large array of pressure transducers for wind tunnel measurements in which switching from calibration to test pressures may be made in a short period of time.

It is a further object of this invention to provide a large array of pressure transducers for measuring wind tunnel pressures for use with high speed date reduction systems.

It is still a further object of this invention to provide a means to simultaneously calibrate a large number of pressure transducers within a wind tunnel and record this calibration in a data storage system.

It is yet another object of this invention to provide a large array of pressure transducers for simultaneously measuring a large number of independent pressures within a wind tunnel.

Other objects and many of the attendant advantages of this invention will be readily appreciated as the same become better understood by reference to the detailed description when considered in connection with the accompanying drawings in which like reference numerals designate like parts throughout the figures thereof and wherein:

FIG. 1 of the drawings illustrates a cylinder, partly in section, which includes a transducer and valve assembly of an embodiment of the instant invention in which the valve is in the tunnel read position;

FIG. 2 illustrates a partial section of the transducer and valve assembly in which the valve is in the calibrate position;

FIG. 3 of the drawings illustrates a view of the inside of the valve body of this invention;

Figure 1:
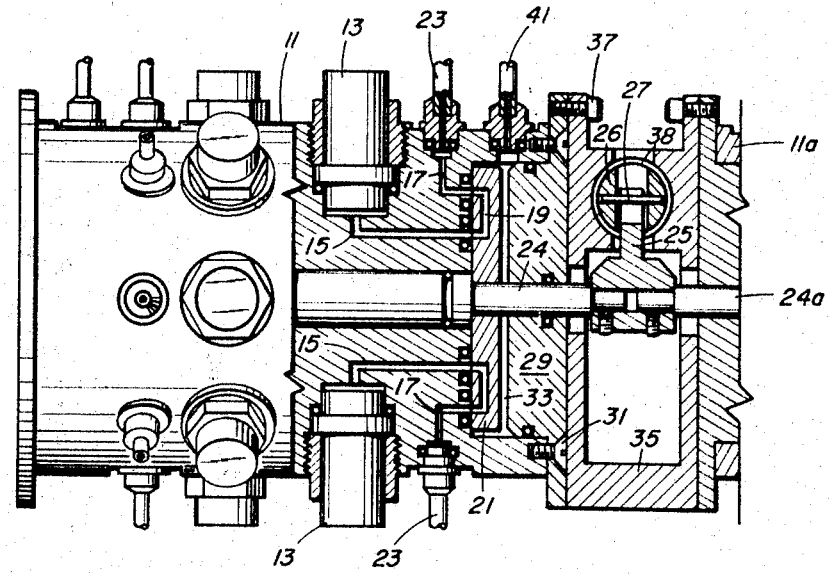

Referring now to FIG. 1 of the drawings in which the pressure transducer and rotary valve assembly is illustrated, cylindrical body 11, shown partly in section, has two rows of radially disposed and aligned pressure transducer units 13. In the first or tunnel read position in which pressures from the tunnel are applied to the transducers, passageways 15 are connected to passageways 17 through passageways 19 of the rotating valve body 21. Pipes or tubing 23 connect to test pressure stations within the wind tunnel such the pressures may be applied directly to the transducers 13 through passageways 15, 17, and 19 when the valve 21 is in the tunnel read position. The selector or valve 21 is mounted on a shaft 24. Shaft 24 is connected to a connecting rod member 25 which is connected to piston 26 through pin 27. End plate 29 is attached to cylinder 11 by bolt members 31. A vacuum chamber 33 is formed by a space between rotary valve body 21 and end plate 29. A piston housing 35 is connected to end plate 29 by bolt members 37. It is noted that a second cylinder body 11a may also be bolted to the piston housing 35. Piston 26 is slideable within cylinder wall 38. It is also noted that a shaft 24a may be fastened to the piston connecting rod 25.

Figure 2:
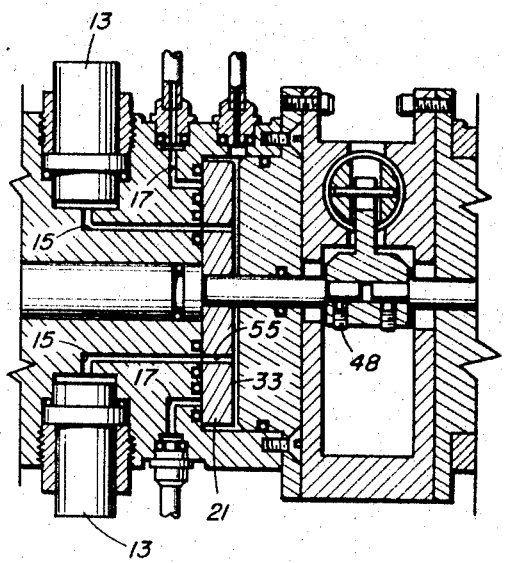

Referring now to FIG. 2 of the drawings, it may be seen that the selector disc or valve body has been rotated to the test or calibrate position. In this position, passageways 17 are disconnected from passageways 15 and passageways 15 are in communication with the vacuum chamber 33. Vacuum chamber 33 connects to the vacuum reference tube 41. With the valve 21 in this position all eight of the transducers 13 are in pneumatic communication with vacuum reference chamber 33. In this position either a total vacuum or a reference pressure may be applied to transducers 13 in order that the transducers may be calibrated. Transducers 13 will provide an electrical output voltage which is proportional to the pressure applied. Normally the transducers will have a linear pressure and voltage characteristic and therefore it is necessary only to calibrate them at two points, preferably a vacuum and a known reference pressure. In this manner the electrical characteristic of the transducer may be determined and stored in a data reduction system.

Figure 3:
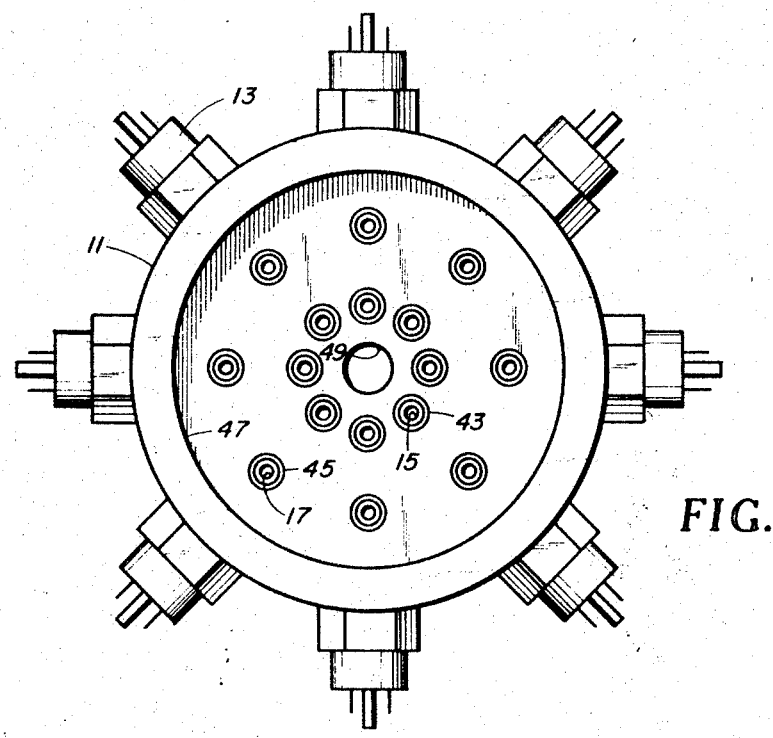

Referring now to FIG. 3 of the drawings, a section through cylinder 11 is shown in which the rotary valve or selector disc 21 is housed. The inner passageways 15 are provided with O-rings 43 and the outer passageways 17 are provided with O-rings 45. Cylindrical body 11 is provided with central hole 49 to accept shaft 24.

Figure 4:
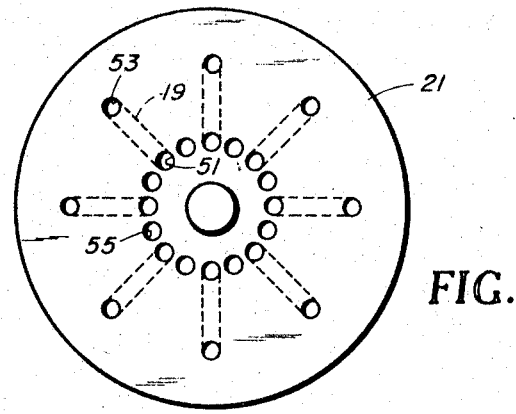
FIG. 4 illustrates the valve body of the instant invention.

Referring now to FIG. 4 of the drawings, the rotary valve body 21 may be seen with the holes or passageways which provide connections between the vacuum chamber and the pressure transducers. It is noted that the inner holes 51 and the outer holes 53 are connected to the passageways 19. It is further noted that inner holes 55 are drilled completely through the entire width of the valve body to form passageways which are shown in FIG. 2 of the drawings. The outer circumference of valve body 21 fits movably within cylindrical surface 47 of cylindrical body 11.

Figure 5:
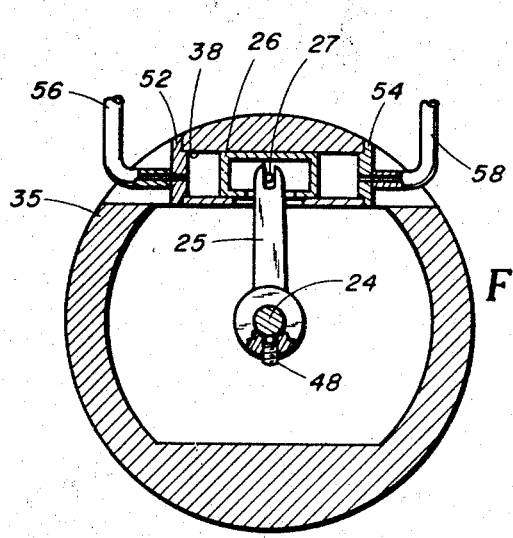
FIG. 5 illustrates a view partly in section of the piston actuation means of the valve body of the instant invention.

Referring now to FIG. 5 of the drawings in which a sectional view of the pneumatic actuating device is illustrated, a piston actuating housing 35 is shown containing a piston 26 which is designed for slideable engagement with cylinder wall 38 of housing 35. A connecting arm or rod 25 is provided for converting the translational motion of piston 26 into the rotary motion required for the rotary valve 21, not shown. Connecting arm or rod 25 may be connected to piston 26 by bearing or pin 27 and the other end of the connecting rod 25 may be fixedly attached to rotary shaft 24 by means of threaded bolts 48. Cover plates 52 and 54 may be used to seal the ends of cylinder wall 37 and provide a means for connecting pressure tubes 56 and 58 to the piston 26.

In operation, the rotary valve may be rotated to the right by the application of a fluid pressure through tube 56, and similarly the rotary valve may be rotated to the left by applying a fluid pressure through tube 58. Stops may be provided to assure alignment of the passageways in the cylindrical block with the passageways in the valve for each position of the valve.

Figure 6:
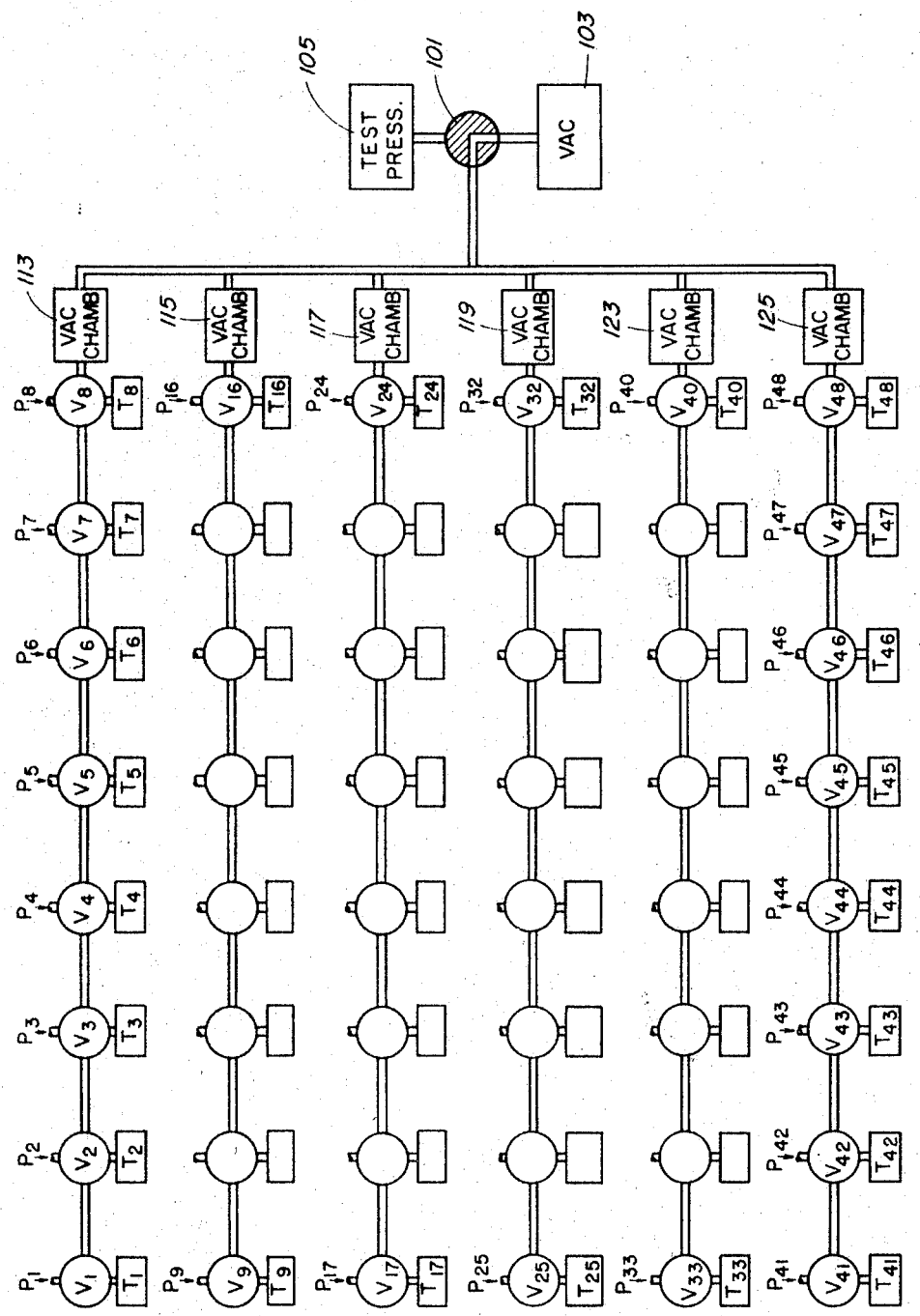
FIG. 6 illustrates a flow diagram in a forty-eight pressure transducer system.

Referring now to FIG. 6 of the drawings, a system for calibrating and reading tunnel pressures from forty-eight different locations within the tunnel is provided in which a two-way valve 101 connects six banks of eight transducers each to either a vacuum, or to a test pressure. A source of vacuum is provided by unit 103 and a source of test pressure is provided by unit 105. A first bank of transducers T1 through T8 is connected to vacuum chamber 113 or to tunnel pressures P1 through P8, respectively, by the operation of valves V1 through V8, respectively, Similarly, valves V9 through V16 connect transducers T9 through T16, respectively, to pressures P9 through P16, respectively, and to vacuum chamber 115. In the same manner valves V17 through V24 connect transducers T17 through T24 to pressures P17 through P24, respectively, or to vacuum chamber 117, and again, in the same manner, valves V25 through V32 connect transducers T25 through T32 to pressures P25 through P32, respectively, and to vacuum chamber 119. Valves V33 through V40 connect transducers T33 through T40 to pressures P33 through P40, respectively, or to vacuum chamber 123. Similarly, valves V41 through V48 connect transducers V41 through V48 to pressures P41 through P48, respectively, or to vacuum chamber 125. In the operation, valves V1 through V48 may be mechanically connected or ganged together to operate simultaneously. Initially, valves V1 through V48 will be set to connect the transducers T1 through T48 to the calibrate position; that is, the transducers will be connected to their respective vacuum chambers and to the vacuum and test pressure units. When the valve 101 is in the position shown, a hard vacuum may be applied to the transducers through the respective vacuum chambers. The vacuum chambers will be evacuated by vacuum unit 103. A zero pressure or vacuum may now be taken and recorded from each of the transducers T1 through T48 to establish a first calibration pressure point for each of the transducers. Valve 101 may then be rotated to a position in which test pressure unit 205 is connected to vacuum chambers 113 through 125. Readings may again be taken and recorded from each of the transducers to establish second calibration pressure points for each of the transducers. A line drawn between the first and second calibration pressure points of each of the transducers will give the characteristics of each of the transducers. Valves V1 through V48 may now be simultaneously switched to the tunnel pressure read position and forty-eight independent and separate pressures P1 through P48 may now be measured separately by transducers T1 through T48, respectively. Transducers will have electrical outputs, not shown, which may be connected to input circuits of a high speed data reduction unit, not shown.

What is claimed as new and desired to be secured by Letters Patent of the United States is:

1. A multiport valve assembly comprising:
a valve housing providing:
   a generally cylindrical chamber therein having a first radius, a central axis, and a substantially flat first end,
   a first plurality of passages, each having a first port in fluid communication with said chamber at said first end thereof, at a first radial distance from said axis, and substantially equally circumferentially spaced,
   a second plurality of passages equal in number to said first plurality of passages, each having a second port in fluid communication with said chamber at said first end thereof, at a second radial distance from said axis greater than said first radial distance, and in radial alignment with one of said first ports, and
   another passage having another port in fluid communication with said chamber;
a generally cylindrical disc valve having a second radius less than said first radius but greater than said second radial distance, a central axis, a substantially flat first end, and another end, said disc valve being rotatably mounted coaxially within said chamber with said first end thereof sealingly abutting against said first end of said chamber, and providing:
   a third plurality of passages equal in number to said first plurality of passages, each having:
      a third port in said first end of said disc valve, at a third radial distance from the axis thereof equal to said first radial distance, and substantially equally circumferentially spaced and
      a fourth port in said first end of said disc valve, at a fourth radial distance from the axis thereof equal to said second radial distance, and in radial alignment with one of said third ports and
   a fourth plurality of passages equal in number to said first plurality of passages, each having:
      a fifth port in said first end of said disc valve, at a fifth radial distance from the axis thereof equal to said first radial distance, substantially equally circumferentially spaced, and positioned between said third ports and
      a sixth port in said disc valve in said other end thereof; and
means for intermittently rotating said disc valve between a first position in which said first and third ports are aligned and said second and fourth ports are aligned and a second position in which said first and fifth ports are aligned.

2. The multiport valve assembly of claim 1 further comprising a plurality of O-rings, one of said O-rings disposed in an annular groove provided in said valve housing around each of said first and second ports.

3. The multiport valve assembly of claim 1 wherein said first plurality of passages includes at least eight passages.

4. The multiport valve assembly of claim 1 wherein said means for intermittently reciprocally rotating said disc valve comprises:
an elongate shaft coaxially aligned with and fixedly secured to said disc valve for rotation therewith; and
means for intermittently reciprocally rotating said shaft.

5. The multiport valve assembly of claim 4 wherein said means for intermittently reciprocally rotating said shaft comprises:
a connecting rod fixedly secured at one extremity to said shaft for rotation therewith and having another extremity extending radially therefrom;
means providing an elongate cylinder;
a piston reciprocally slidably mounted in said cylinder and operatively connected to said other extremity of said connecting rod for rotational movement thereof about said axis of said disc valve.

6. The multiport valve assembly of claim 5 further comprising a plurality of O-rings, one of said O-rings disposed in an annular groove provided in said valve housing around each of said first and second ports.

7. The multiport valve assembly of claim 5 wherein said first plurality of passages includes at least eight passages.

8. The multiport valve assembly of claim 5 further comprising pressure tubes in fluid communication with opposite extremities of said cylinder for periodically applying pressure to opposite sides of said piston.

9. The multiport valve assembly of claim 8 further comprising a plurality of O-rings, one of said O-rings disposed in an annular groove provided in said valve housing around each of said first and second ports.

10. The multiport valve assembly of claim 8 wherein said first plurality of passages includes at least eight passages.

References Cited

UNITED STATES PATENTS

| | | | |
|---|---|---|---|
| 793,058 | 6/1905 | Colhoun | 137—625.21 X |
| 961,466 | 6/1910 | Shade | 137—625.21 |
| 2,734,674 | 2/1956 | Ray | 137—625.21 X |

M. CARY NELSON, Primary Examiner

M. O. STURM, Assistant Examiner

U.S. Cl. X.R.

137—625